US012756255B2

(12) United States Patent
Takemoto et al.

(10) Patent No.: US 12,756,255 B2
(45) Date of Patent: Oct. 6, 2026

(54) EDGE SEALED SLOT LINER

(71) Applicant: 3M INNOVATIVE PROPERTIES COMPANY, St. Paul, MN (US)

(72) Inventors: Naohiro Takemoto, Sagamihara (JP); Hiroyuki Hirayama, Sagamihara (JP); Naoyuki Toriumi, Sagamihara (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 19/141,404

(22) PCT Filed: Dec. 6, 2023

(86) PCT No.: PCT/IB2023/062335
§ 371 (c)(1),
(2) Date: Jun. 20, 2025

(87) PCT Pub. No.: WO2024/141835
PCT Pub. Date: Jul. 4, 2024

(65) Prior Publication Data

US 2026/0112935 A1 Apr. 23, 2026

(30) Foreign Application Priority Data

Dec. 27, 2022 (JP) ................................ 2022-209118

(51) Int. Cl.
*H02K 3/30* (2006.01)
*B32B 5/02* (2006.01)
(Continued)

(52) U.S. Cl.
CPC ............... *H02K 3/30* (2013.01); *B32B 5/022* (2013.01); *B32B 7/12* (2013.01); *B32B 27/12* (2013.01);
(Continued)

(58) Field of Classification Search
CPC B32B 5/022; B32B 7/12; B32B 27/12; B32B 27/36; B32B 2250/05;
(Continued)

(56) References Cited

U.S. PATENT DOCUMENTS 12,611,842 B2 * 4/2026 Xu .......................... B32B 5/022
2008/0241541 A1 * 10/2008 Conrad .................. B32B 5/022 428/402.24
(Continued)

FOREIGN PATENT DOCUMENTS

JP 2016046890 A 4/2016
JP 2016154405 A 8/2016
(Continued)

OTHER PUBLICATIONS

International Search Report for PCT International Application No. PCT/IB2023/062335, mailed on Feb. 20, 2024, 4 pages.

*Primary Examiner* — Rashad H Johnson
(74) *Attorney, Agent, or Firm* — Gregg H. Rosenblatt

(57) ABSTRACT

A multi-layer slot liner for a rotary electrical system, comprising an electrically insulating substrate layer, a first heat-activated adhesive layer comprising thermally expandable particles which is arranged on a first surface of the substrate layer, and a first adhesive permeable cover layer arranged on the first heat-activated adhesive layer. At least two of the layers extend together and terminate at an edge, where the edge is covered by a seal.

14 Claims, 3 Drawing Sheets

(51) Int. Cl.

| | |
|---|---|
| ***B32B 7/12*** | (2006.01) |
| ***B32B 27/12*** | (2006.01) |
| ***B32B 27/36*** | (2006.01) |
| ***C09J 5/06*** | (2006.01) |
| ***C09J 133/14*** | (2006.01) |
| ***C09J 163/00*** | (2006.01) |
| ***C09J 175/04*** | (2006.01) |
| ***H02K 3/34*** | (2006.01) |
| ***H02K 15/108*** | (2025.01) |

(52) U.S. Cl.

CPC ................. *B32B 27/36* (2013.01); *C09J 5/06* (2013.01); *C09J 133/14* (2013.01); *C09J 163/00* (2013.01); *C09J 175/04* (2013.01); *H02K 3/345* (2013.01); *H02K 15/108* (2025.01); *B32B 2250/05* (2013.01); *B32B 2307/206* (2013.01); *B32B 2457/04* (2013.01); *C09J 2400/266* (2013.01); *C09J 2433/00* (2013.01); *C09J 2463/00* (2013.01); *C09J 2475/00* (2013.01)

(58) Field of Classification Search

CPC .. B32B 2307/206; B32B 2457/04; C09J 5/06; C09J 133/14; C09J 163/00; C09J 175/04; C09J 2400/266; C09J 2433/00; H02K 3/30; H02K 3/345; H02K 15/08

USPC .......................................................... 310/215

See application file for complete search history.

(56) References Cited

U.S. PATENT DOCUMENTS

| | | | | |
|---|---|---|---|---|
| 2009/0036012 | A1* | 2/2009 | Nhan | D21H 13/48 442/268 |
| 2010/0040842 | A1* | 2/2010 | Everaerts | B32B 7/12 156/331.7 |
| 2011/0259565 | A1* | 10/2011 | Izutani | H10W 40/251 165/185 |
| 2012/0295052 | A1* | 11/2012 | Choi | C09J 9/02 428/323 |
| 2013/0183471 | A1* | 7/2013 | Luhmann | C09J 7/30 156/60 |
| 2015/0104601 | A1* | 4/2015 | Appeaning | C09J 7/385 428/41.4 |
| 2016/0128877 | A1* | 5/2016 | Chandrasekaran | A61F 13/58 156/60 |
| 2018/0155581 | A1* | 6/2018 | Steiner | C09J 7/30 |
| 2018/0272646 | A1* | 9/2018 | Cura | B32B 7/04 |
| 2019/0008000 | A1* | 1/2019 | Li | B32B 15/09 |
| 2021/0183535 | A1* | 6/2021 | Natori | H01B 3/305 |
| 2021/0187927 | A1* | 6/2021 | Hebert | B32B 15/092 |
| 2021/0207010 | A1* | 7/2021 | Takagi | C09J 163/04 |
| 2021/0238450 | A1* | 8/2021 | Galush | C09D 5/002 |
| 2021/0257690 | A1* | 8/2021 | Kilhenny | B32B 25/04 |
| 2022/0041897 | A1* | 2/2022 | Ho | B05D 7/536 |
| 2022/0073788 | A1* | 3/2022 | Bolton | C09J 7/387 |
| 2022/0270779 | A1* | 8/2022 | Tamura | B32B 25/02 |
| 2022/0324215 | A1* | 10/2022 | Nevoret | B32B 25/08 |
| 2022/0352574 | A1* | 11/2022 | Lu | B32B 15/085 |
| 2022/0396716 | A1* | 12/2022 | Cura | C09J 163/00 |
| 2023/0001541 | A1* | 1/2023 | Li | B24D 11/001 |
| 2023/0029583 | A1* | 2/2023 | Hwang | C09D 133/066 |
| 2023/0036300 | A1* | 2/2023 | Hwang | C09J 183/04 |
| 2024/0207108 | A1* | 6/2024 | Heege | B32B 9/02 |
| 2024/0301239 | A1* | 9/2024 | Lu | C08G 18/4063 |
| 2024/0307722 | A1* | 9/2024 | Liu | C09J 7/401 |
| 2025/0018694 | A1* | 1/2025 | Elias | B32B 27/34 |

FOREIGN PATENT DOCUMENTS

| | | | |
|---|---|---|---|
| JP | 2016174441 | A | 9/2016 |
| JP | 2017028911 | A | 2/2017 |
| JP | 2017077095 | A | 4/2017 |
| JP | 2019203062 | A | 11/2019 |
| JP | 2021127371 | A | 9/2021 |
| JP | 2021525296 | A | 9/2021 |
| WO | 2021161118 | A1 | 8/2021 |

* cited by examiner

EDGE SEALED SLOT LINER

CROSS REFERENCE TO RELATED APPLICATIONS

This application is a national stage filing under 35 U.S.C. 371 of PCT/IB2023/062355, filed Dec. 6, 2023, which claims the benefit of Japan Application No. 2022-209118, filed Dec. 27, 2022, the disclosure of which is incorporated by reference in its/their entirety herein.

TECHNICAL FIELD

The present invention relates to slot liners, and more particularly slot liners comprising thermally expandable particles.

BACKGROUND

Slot liners are used in electric motors and generators to provide electrical insulation between conductive windings and the slots in stator cores that house the conductive windings. More recently, multi-layer composite laminate slot liners have been developed for exacting specifications of thickness, flexibility, dielectric strength, temperature ratings, low surface friction, and so forth to improve performance, reliability and ease of manufacturing to meet the necessary performance requirements in electric vehicles.

The automated construction of electrical equipment has led to the use of novel materials in slot liners that can aid in the automated assembly of a stator for a motor. For example, heat activated slot liners that expand upon heating are described in Patent Document 1. However, laminated composites may be affected by operational exposure to heat, solvents and mechanical impact, leading to deformation and delamination. A continuous need exists for more durable slot liners that can withstand these environmental factors in order to achieve improved reliability.

US 2021/0207010A describes a slot liner with a thermally expandable adhesive layer formed on the surface of a substrate, and an adhesive permeable layer is provided on a surface of the adhesive layer. The adhesive permeable layer is permeable to the heated adhesive at the time of the thermal expansion of the adhesive. Therefore, by heating the adhesive sheet, adhesive from the heat activated adhesive layer permeates the adhesive permeable layer, emerging on the outermost surface of the adhesive sheet and bonding to the surface adjacent to the adhesive permeable layer, thereby simplifying adhesive deposition.

SUMMARY OF INVENTION

A problem presented by a slot liner with a multi-layer construction is that it may experience deformation, or even delamination of one or more layers, during curing as well as after multiple heating and cooling cycles, particularly for devices operated in a high heat environment. This problem stems from the differing thermal expansion coefficients of the materials in each layer, as well as their shrinkage behavior due to contraction upon cooling. Non-uniform expansion and shrinkage of adjacent layers results in inter-layer stresses which may not resolve over time, leading to residual stresses which build-up and eventually deform the slot liner. When the inter-layer stresses are sufficiently large, delamination of one or more layers within the slot liner can occur. Delamination leads to reduced insulation reliability, which in turn leads to premature motor or generator failure.

To solve the problem described above, in one aspect, the invention provides a multi-layer slot liner for a rotary electrical system, comprising an electrically insulating substrate layer, a first heat-activated adhesive layer arranged on a first surface of the substrate layer, and a first adhesive permeable cover layer arranged on the first heat-activated adhesive layer, at least two of the layers extending together and terminating at an edge, wherein the edge is covered by a seal. The multi-layer slot liner may further comprise a second heat activated adhesive layer arranged on a second surface of the substrate layer, the second surface being located on an opposing side of the substrate layer from the first surface, and a second adhesive permeable cover layer arranged on the second heat-activated adhesive layer.

With the present invention configured in such a manner where the edge of the slot liner is sealed, the initiation of delamination at the edge of the slot liner can be reduced. The seal at the edge of the slot liner mechanically holds together the individual layers of the slot liner. It also prevents the edges of the individual layers of the slot liner from being directly exposed to environmental factors that weaken the cohesion between the layers. In addition, the seal may also comprise materials that possess heat resistance, resilience and mechanical strength, thereby imparting beneficial properties to the edge of the slot liner that enables it to better withstand high heat environments, folding and rough handling during assembly, and impact and vibrational stresses during use.

In another aspect, the invention provides a method of sealing an edge of a slot liner in a stator of a rotary electrical system, comprising: providing a continuous multi-layer sheet comprising an electrically insulating substrate layer, a first heat activated adhesive layer arranged on a first surface of the substrate layer, and a first adhesive permeable cover layer arranged on the first heat-activated adhesive layer, at least two of the layers extending together and terminating at an edge, cutting a section of the sheet to form a slot liner and arranging the slot liner into a slot of the stator repeatedly until all slots are filled, applying a sealing composition to the edges of the slot liners, and curing the sealing composition to form a seal that covers the edges of the slot liners. Thereafter, the assembly of conductive windings into the slots of the stator may be carried out. After the conductive windings have been assembled, the stator can be heated to activate and cure the adhesive present in the heat activated adhesive layer in the slot liner.

With the present invention configured in such a manner, after the slots have been filled in accordance with conventional processes, the slot liner edges can be sealed batch-wise in-situ in the stator by using any suitably designed applicator or coating process to deposit the sealing composition onto the slot liner edges, and heating to cure the sealing composition. Alternatively, slot liners may also be prefabricated with sealed edges and then inserted into the stator slots. Either way, the sealing of slot liner edges is compatible with existing slot liner assembly processes, without the need to substantially alter existing equipment or process steps.

If the seal is formed during assembly of the slot liner into the stator, the seal preferably comprises an adhesive having a high viscosity in its uncured state. Adhesives with a viscous quality, being in the form of a viscous fluid or a gel, facilitates controlled deposition over the edge of the slot liner. It may also be preferable that the seal comprises a waterproof, heat resistant and mechanically strong material, such as that obtainable from cyanoacrylate or urethane adhesives.

The heat activated adhesive layer preferably comprises thermally expandable particles having a foaming start temperature $T_e$. In order to ensure good adhesion between the layers in the slot liner, it is preferable that the thermally expandable particles are gradually and completely activated. For this purpose, a two-step, sequential heating process is preferably carried out. In a first heating step, the slot liner is heated to a first temperature $T_1$:S $T_s$ to initiate expansion of the adhesive layer, and in a second step, the slot liner is heated to a second temperature $T_2 > T_s$ to completely cure the heat activated adhesive layer.

The present invention provides a multilayer slot liner containing thermally expandable particles which has improved durability over the existing slot liners due to the sealing of its edges to prevent the initiation of delamination of its layers at the edges of the slot liner.

DETAILED DESCRIPTION OF THE EMBODIMENTS

Figure 1:
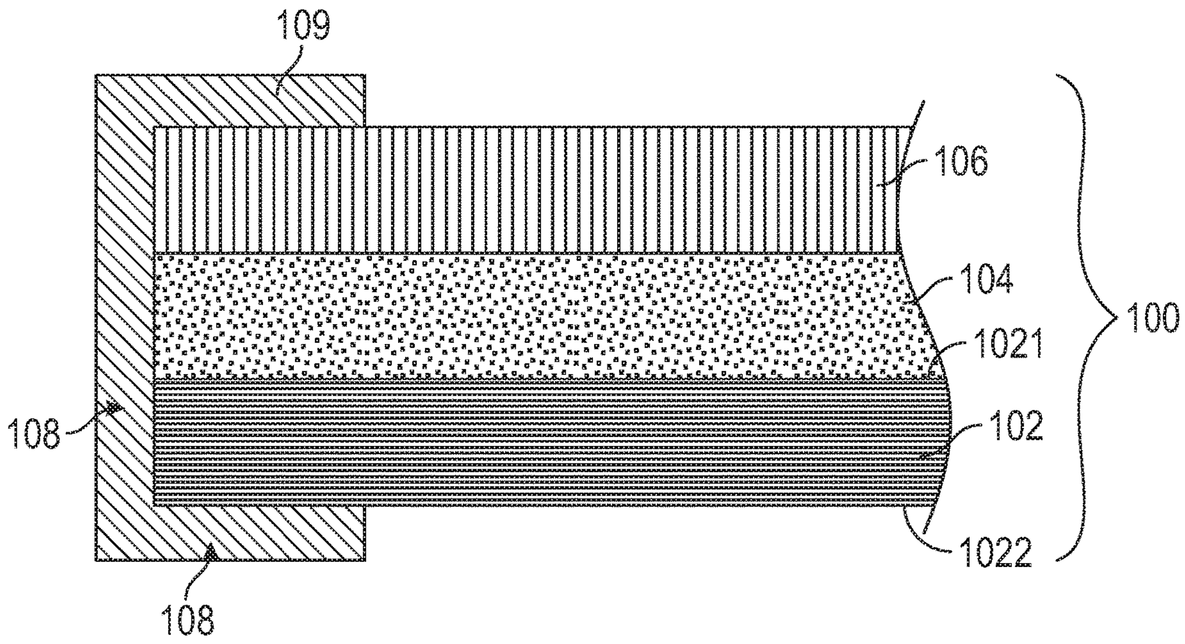
FIG. 1 is a cross-sectional view of a one-sided slot liner according to an embodiment.

The present invention provides an edge sealed slot liner having improved reliability due to the encapsulation of the slot liner edge with a seal. FIG. 1 is a cross-sectional view illustrating the configuration of the multi-layer slot liner in accordance with the present invention. As illustrated in FIG. 1, the slot liner 100 includes a substrate layer 102 having surface 1021 and surface 1022 on opposite sides. A heat activated adhesive layer 104 is arranged on surface 1021 of the substrate layer 102. An adhesive permeable cover layer 106 is arranged on the heat activated adhesive layer 104. At least two of the layers 102, 104, 106 extend together across the slot liner, terminating to form an edge 108. A seal 109 is formed at edge 108 where it contacts the ends of the layers forming the edge 108 and covers completely the ends of the individual layers in the slot liner, thereby encapsulating the edge 108. In this embodiment, all three layers 102, 104, 106 are coextensive and terminate to form the edge. The seal 109 completely covers the ends of each of the three layers in the slot liner, thereby encapsulating the edge 108. In another embodiment, only the heat activated adhesive layers 104 and adhesive permeable cover layer 106 terminate to form the edge, while the end of the substrate layer 102 either terminates before, or extends beyond, said edge. Accordingly, in this embodiment, the seal covers the ends of the heat activated adhesive layer 104 and adhesive permeable cover layer 106. In this embodiment, the slot liner provides adhesion only on one side. The opposing side of the slot liner is the substrate layer surface, and it may be optionally coated with other materials, such as low friction materials which facilitates insertion into the slot e.g. polytetrafluoroethylene (PTFE), or thermally conductive and electrically insulating materials e.g. boron nitride, to improve the conduction of heat away from the conductive windings to the stator body.

Figure 2:
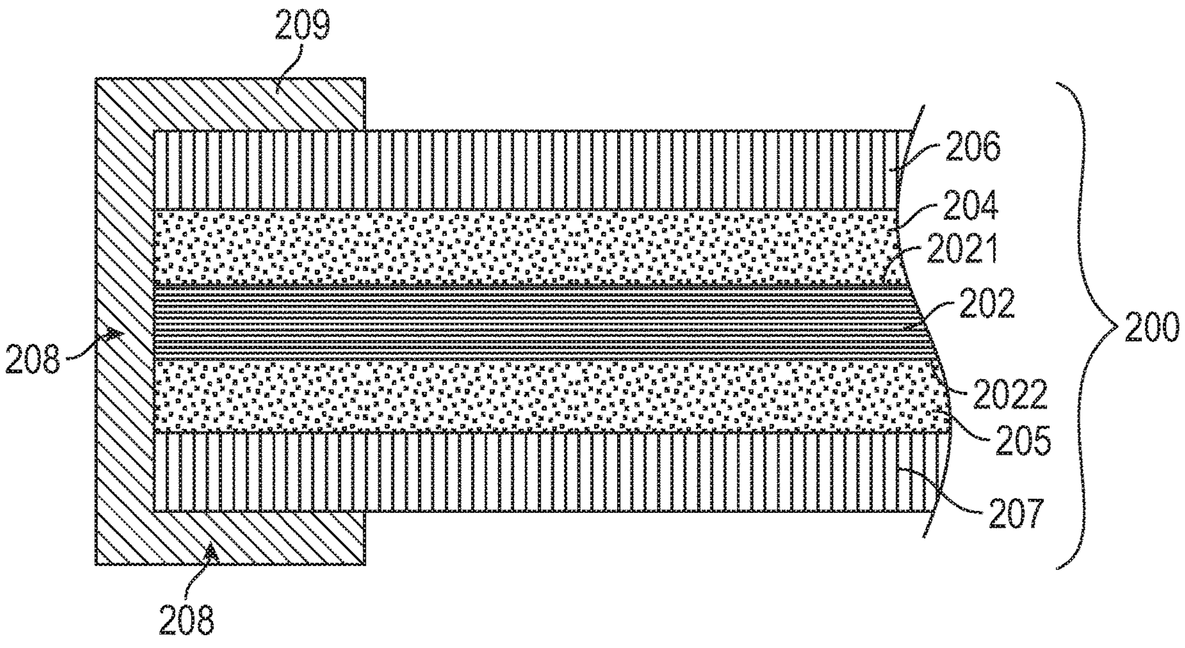
FIG. 2 is a cross-sectional view of a two-sided slot liner according to an embodiment.

The heat activated adhesive layer and adhesive permeable cover layer may be provided on only one side of the substrate layer as shown in FIG. 1, or on both sides of the substrate. In a preferred embodiment, a second heat activated adhesive layer is arranged on a second surface of the substrate, the second surface being located on an opposing side of the substrate from the first surface, and a second adhesive permeable cover layer is arranged on the second heat-activated adhesive layer. In other words, in this embodiment, both sides of the substrate layer each comprise an adhesive layer and adhesive permeable cover layer. Referring to FIG. 2, the slot liner 200 includes a substrate layer 202 having surface 2021 and surface 2022 on opposite sides. A heat activated adhesive layer 204 is arranged on surface 2021, and an adhesive permeable cover layer 106 is arranged on the heat activated adhesive layer 204. Similarly, on the other side, a heat activated adhesive layer 205 is arranged on surface 2022, and an adhesive permeable cover layer 107 is arranged on the heat activated adhesive layer 205. In this embodiment, the slot liner is capable of adhesion on both sides of the slot liner to the conductive windings as well as the stator wall that are adjacent to the slot liner.

At least two of the layers 202, 204, 205, 206 and 207 extend together across the slot liner, terminating to form an edge 208. A seal 209 is formed at the edge 208 where it contacts and covers the ends of each of the layers forming the edge 208, thereby encapsulating the edge 208. In the embodiment shown in FIG. 2, all five layers 202, 204, 205, 206 and 207 are coextensive and terminate to form the edge 208. In another embodiment, only some of the layers terminate to form the edge. For example, the heat activated adhesive layers 204 and adhesive permeable cover layer 206 may terminate on surface 2021 to form a first edge, the heat activated adhesive layers 205 and adhesive permeable cover layer 207 may terminate on surface 2022 to form a second edge, while the end of the substrate layer 202 either terminates before, or extends beyond, said first and second edges. In this embodiment, seal 209 may be formed separately to cover the first and second edges.

The substrate functions as a support for carrying all the other layers of the slot liner. Thus, any material with sufficient mechanical strength may be used. As the slot liner is folded in prior to assembly into a slot, the material used should not be rigid but resilient and flexible. In addition, the substrate is preferably an electrically insulating material. Exemplary substrates should be heat resistant film materials that can withstand exposure to heat, although not necessarily thermally insulating. Exemplary substrates include, for example, polyaramide film, polycarbonate film, polyimide (PI) film, polyester (PET) films, polyethylene naphthalate (PEN) film, polyetheretherketone (PEEK) film, nylon, or PEN/polymethylmethacrylate multilayer films. Taking multiple factors of strength, heat resistance, and other factors into consideration, a polyimide or a polyethylene naphthalate film, for example, are preferably used as the substrate layer 202.

The heat activated adhesive layers 204, 205 comprise any suitable adhesive that are heat curable. One example is thermoset adhesives that cure at elevated temperatures. In addition, the adhesive preferably possesses thermoplastic properties, being initially in a non-fluid state, but becomes fluid when heated. In a preferred embodiment, epoxies are used in the adhesive layer. Bi-functional epoxy, tri-functional epoxy tetra-functional epoxy, and in general, epoxies with multi-functionalities, are preferable for curing into a hard, durable and heat resistant material. In particular, a thermosetting epoxy resin can be used as the adhesive. Examples of resins that can be used as thermosetting epoxy resins include but are not limited to bisphenol epoxy resins such as bisphenol A epoxy resins and bisphenol F epoxy resins, epoxy resins having an aliphatic skeleton such as hexanediol diglycidyl ether, glycidyl amine epoxy resins such as triglycidyl amino phenol, novolac epoxy resins such as phenol novolac epoxy resins and cresol novolac epoxy resins, brominated epoxy resins, alicylic epoxy resins, and mixtures thereof. The thermosetting epoxy resin may further contain a phenoxy resin (poly hydroxy polyether synthesized from bisphenols and epichlorohydrin) as a thermoplastic component. In a preferred embodiment, the adhesive in the heat activated adhesive layer is obtained from a triphenylmethane type phenol resin, and binary or ternary resin systems thereof incorporating other resins.

In an embodiment, the heat activated adhesive layer includes a foaming agent which enables the adhesive to foam and thereby expand. The foaming agent may be any suitable foaming agent and is not particularly limited. The foaming agent is preferably a temperature-sensitive blowing agent. Examples of the foaming agent include inorganic blowing agents such as ammonium carbonate, ammonium hydrogen carbonate, ammonium nitrite, ammonium borohydride, and azides; alkanes fluoride such as trichloromonofluoromethane, azo compounds such as azobis isobutyronitrile, hydrazine compounds such as paratoluenesulfonyl hydrazide, Semicarbazide compounds such as p-toluenesulfonylsemicarbazide, triazole compounds such as 5-morpholyl-1,2,3,4-thiatriazole, N, N-organic foaming agents such as N-nitroso compounds such as dinitrosoterephthalamide. An example of a chemical foaming agent is a combination of aluminum powder, NaOH and $NaHCO_3$ and may be used in epoxy resin. Polysilazanes may also be used as a chemical foaming agent to modify polyamine hardeners for epoxy adhesives.

Preferably, the foaming agent comprises thermally expandable particles. Thermally expandable particles are microcapsules comprising low boiling liquid hydrocarbon entrapped in a polymer shell. Exemplary microcapsules are those available under the tradename Matsumoto Microsphere® available from Matsumoto Yushi—Seiyaku Co., Ltd. (Japan). Upon heating the microcapsule, thermoplastic resin shell of the microcapsule softens, while the hydrocarbon liquid inside the microcapsule turns to gas, resulting in expansion of the microcapsule up to tens of times its original volume. As heating is further prolonged, the gas inside the shell permeates the microcapsule shell wall and diffuses into the air, so that only the shell of the microcapsule remains in the adhesive after a complete cure.

The temperature at which the thermally expandable particles commence thermally initiated expansion is known as the foaming start temperature ($T_e$). $T_e$ may occur over a temperature range. $T_e$ may be, for example, 90° C. or higher, and from the viewpoint that foaming tends to start after the adhesive is sufficiently soft, 95° C. or higher or 100° C. or higher. Further, the foaming start temperature $T_e$ of the foaming agent may be, for example, 140° C. or lower, and from the viewpoint that a sufficient expansion magnification can be easily obtained before curing the adhesive (A), it may be 135° C. or lower or 130° C. or lower.

The heat activated adhesive may further include other additives. Curing agents may be included to accelerate the curing of adhesives such as epoxies. Elevated temperature latent curing agents may be used to accelerate the curing of high temperature curing adhesives. In an embodiment, the heat activated adhesive layer comprises an epoxy adhesive and a latent curing agent, such as imidazole. Additives such as phenoxy resins can impart flexibility, toughness, adhesive and cohesive strength, as well as chemical, corrosion and heat resistance. Other additives such as impact modifiers, inorganic filler particles, coupling agents, etc. commonly employed in the epoxy adhesive art.

Prior to heat activation, the adhesive permeable cover layer serves to protect the heat activated adhesive layer from damage during handling and to reduce contamination by preventing direct contact with contaminants that may be picked up by the tacky adhesive layer surface. Any suitable material may be selected as the material constituting the adhesive permeable cover layer as long as it is permeable to the heat activated adhesive. The material should also withstand temperatures of up to the curing temperatures used throughout the processes for the slot liner and the operating temperatures of the stator. Textile, paper and nonwovens fabrics that are porous may be suitable for this purpose. Nonwoven fabrics based on natural fibers, polymer fibers, or a mixture thereof are preferable as the material for the adhesive permeable cover layer. Examples of nonwovens include glass fiber nonwovens, polyester nonwovens, aromatic polyamide (aramid) nonwovens, polyolefin-based nonwovens, polysulfone-based nonwovens, polyaramide nonwovens, polyphenylsulfide-based nonwovens, polyester-based nonwoven fabrics, and nylon-based nonwoven fabrics. Nonwovens typically have a large fluidly connected inter-fiber void fraction of above 50% or more that permit the permeation of adhesive into the nonwoven material. Upon heating, the adhesive in the heat activated adhesive layer permeates one surface of the adhesive permeable cover layer. As adhesive enters the nonwoven material, a wicking effect is generated that draws in more adhesive, saturating the adhesive permeable cover layer. As hydrostatic fluid pressure increases from the expanding adhesive beneath, adhesive pushed towards the adhesive permeable cover layer is able to freely exude from the upper surface of the adhesive permeable cover layer.

Figure 3:
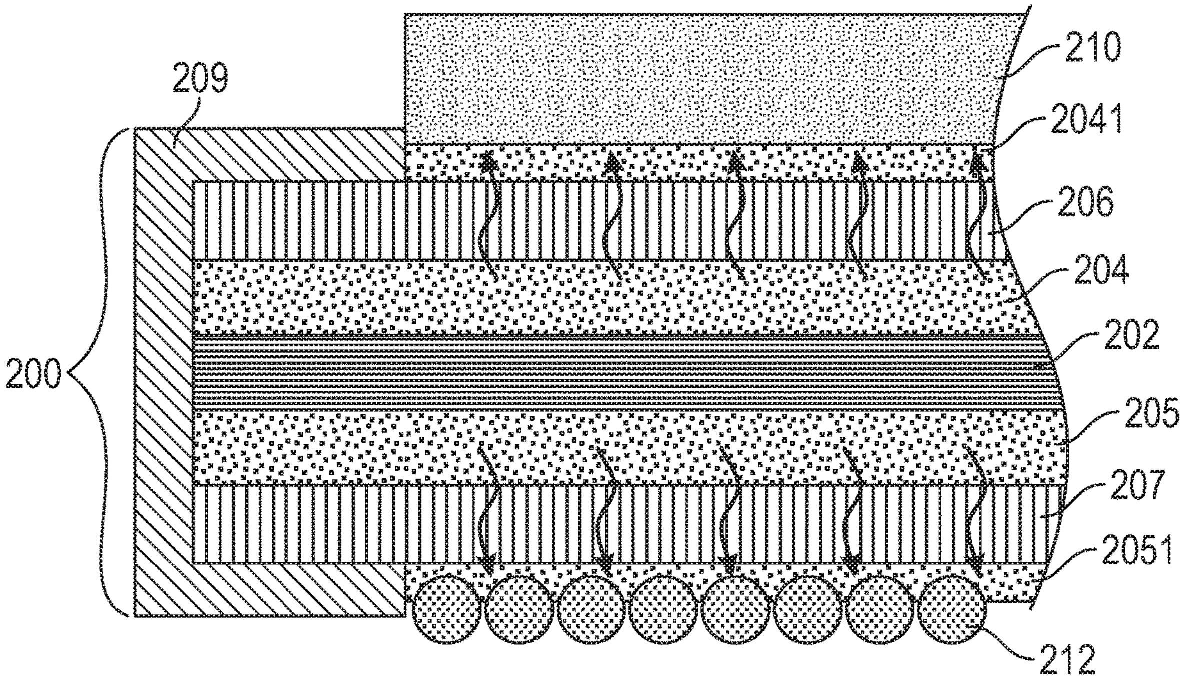
FIG. 3 is a cross-sectional view of the two-sided slot liner after heat treatment in a slot of a stator.

FIG. 3 is a cross-sectional view of the slot liner 200 placed in a slot of a stator and in a final state in which the slot liner has been thermally activated and cured with the slot liner arranged between the walls 210 of the slot in the stator and copper windings 212. Upon heating, the heat activated adhesive layers 204, 205 experiences two changes. Firstly, it turns into a flowable gel or fluid, and secondly, thermally expandable particles present therein expand with a foaming effect which may be vigorous or slow depending on the temperature. These two changes cause the adhesive to expand outwards on both sides in the direction of the black arrows shown in FIG. 3, towards the adhesive permeable cover layers on each side, thereby penetrating and saturating the adhesive permeable cover layers with adhesive. As the adhesive continues to expand, the adhesive eventually exudes from the outer surface of the adhesive permeable cover layers, forming adhesive layers 2041, 2051. Consequently, adhesive layers 2041, 2051 are interposed between the adhesive permeable cover layers and, respectively, the wall 210 of the stator slot, and the copper windings 212. With the heat activated adhesive layer now being fully expanded, the adhesive permeable cover layers are essentially embedded inside the expanded adhesive. Now, by curing the expanded adhesive, adhesion is established between the slot liner 200 and the slot walls of the stator as well as the copper windings, thereby providing mechanical stability to the arrangement. It also facilitates some degree of thermal conduction, where the heat generated in the conductive windings can be conducted via the adhesive away from the conductive windings towards the stator.

The thickness of the heat activated adhesive layer is not particularly limited, and may be, for example, 200 μm or less, and from the viewpoint of good workability, it may be 100 μm or less, 80 μm or less, or 60 μm or less.

Compared with the substrate, the adhesive permeable cover layer may experience different levels of shrinkage after a heating-cooling cycle. This results in residual stress within the slot liner, resulting in that the edges of the slot liner tend to curl as the adhesive permeable cover layer detaches from the substrate, resulting in delamination. At the edge of the adhesive sheet, foaming is more vigorous due to free foaming without a boundary surface, compared to the inner portion of the slot liner where the heat activated adhesive layer is bounded between the substrate and adhesive permeable cover layer. As a consequence, there is a higher tendency for delamination to occur at the edge of the slot liner. Accordingly, the inventors have found that the edge of the slot liner may be advantageously sealed. The seal 209 holds the edge of the slot liner together and provides an impermeable seal that prevents the expanding adhesive from expanding laterally towards the edge of the slot liner and exuding therefrom.

Material for the seal is not particularly limited. Due to the elevated temperature environment in which the stator operates, the seal is preferably comprised of heat resistant material that remains unaffected by heat and should be durable over many heating and cooling cycles through years of operation. The seal may comprise a sealing adhesive tape that is laminated over the edges of the slot liners. This may be done prior to slot liner insertion i.e. the edge-sealed slot liner is pre-fabricated for insertion. The slot liner edges may also be sealed after the insertion of the slot liner into the slot of the stator, through suitable modifications to the slot liner slicing and insertion process.

More preferably, the seal is formed by applying a sealing composition to the slot liner edges during the process of assembling the slot liner into the stator. In a preferred embodiment, the seal and sealing composition comprises an adhesive selected from a urethane, epoxy and acrylic adhesive. For example, heat cured adhesives from 3M™ Scotch-Weld™ Urethane Adhesives and 3M™ Scotch-Weld™ Epoxy Adhesives may be used. In another embodiment, the seal comprises an instant adhesive. Exemplary instant adhesives include cyanoacrylate adhesives 3M™ Scotch-Weld™ Instant Adhesives. In another embodiment, the seal comprises a silicone adhesive. A seal comprising a high temperature silicone may be advantageous due to silicones being capable of withstanding a wide range of temperatures as may be the case to enable the equipment containing the stator to operate in differing climatic conditions. Sealing compositions to be applied to the slot liner edge is preferably be formulated to be an adhesive in the form of a high viscosity fluid. An adhesive that is thixotropic and viscous, in the form of a viscous liquid or more preferably a gel or jelly, or paste, can help to achieve non-drip qualities for precise dispensing. Viscosity is not particularly limited. Liquids and gels with viscosities above 500 centipoise (0.5 Pa·s) and up to 50,000 centipoise (50 Pa·s) may be used, for example. For direct dispensing of the sealing composition, jellies or pastes with a viscosity of above 50,000 centipoise (50 Pa·s), or preferably, above 80,000 centipoise (80 Pa·s) may be used. If dip-coating of the slot liner edges with the sealing composition is carried out, the sealing composition used may be formulated as a liquid or a gel. For dispensing onto a vertically arranged edge, the sealing composition is preferably a viscous non-sag jelly or paste.

The thickness of the cured seal is not particularly limited, and may be, thicker, thinner or comparable to the thickness of the individual layers of the slot liner. For example, it may be comparable to the thickness of the heat activated adhesive layer. The cured seal may be 50 μm or more, 100 μm or more, or 500 μm or more in thickness.

Figure 4:
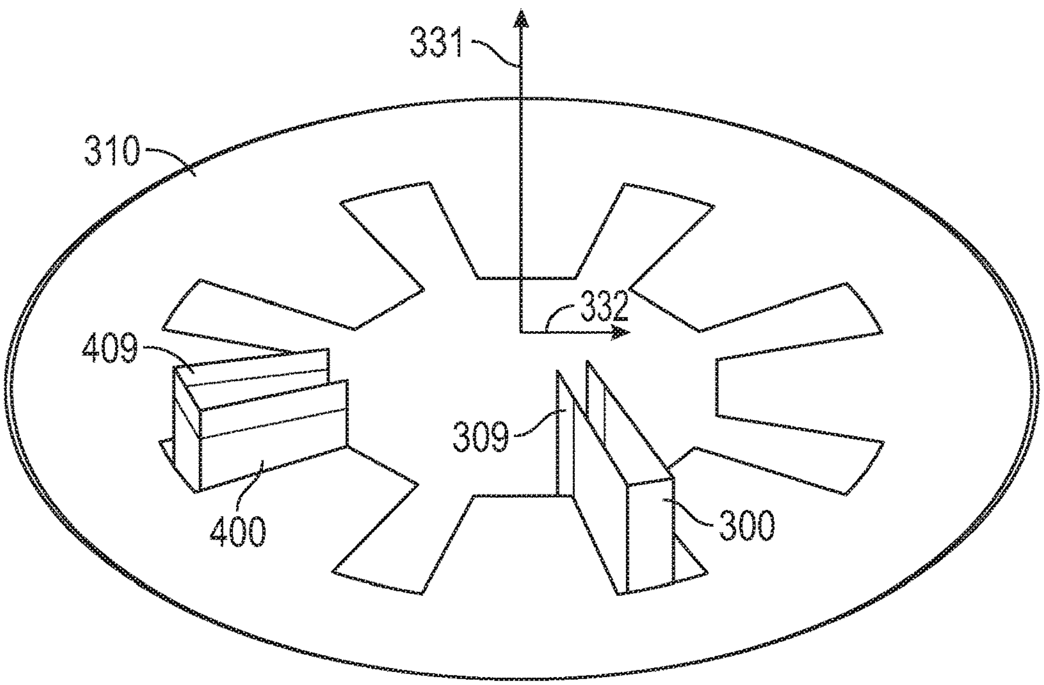
FIG. 4 is a perspective view of slot liners arranged in a stator having either its long or short edge sealed.
Figure 5:
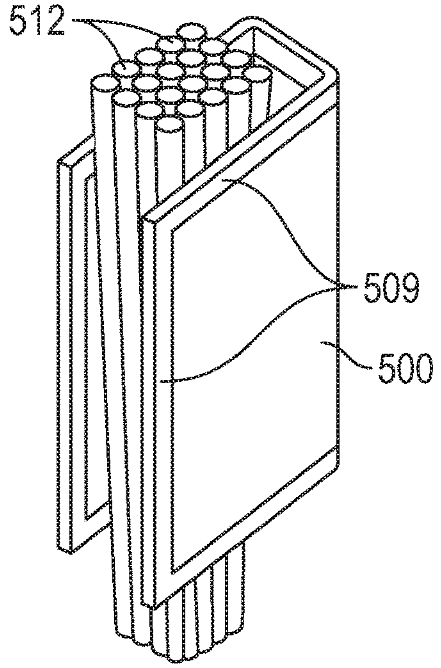
FIG. 5 is a perspective view of a slot liner with conductive windings and having its long and short edge both sealed.

FIG. 4 is a perspective view of a stator 310 with slot liners assembled into some of its slots. Slot liner 300 is shown as having its long edge 309 sealed. The long edge 309 refers to the edge that runs parallel to the longitudinal axis, as shown by arrow 331, of the stator 310. Slot liner 400 is shown as having its short edge 409 sealed. The short edge 409 refers to the edge that runs parallel to the radial axis, as shown by arrow 332, of the stator 310. FIG. 5 is a perspective view of a slot liner 500 having coper windings 512 arranged in between its fold. All edges 509, including the long and short edges, are sealed in this figure.

In accordance with the above figures, the invention provides a convenient method of sealing an edge of a slot liner, comprising: providing a continuous multi-layer sheet comprising an electrically insulating substrate layer, a first heat activated adhesive layer arranged on a first surface of the substrate layer, and a first adhesive permeable cover layer arranged on the first heat-activated adhesive layer, at least two of the layers extending together and terminating at an edge, repeatedly cutting a section of the sheet to form a slot liner and arranging the slot liner into a slot of the stator until all slots are filled, applying a sealing composition to the edges of the slot liners, and curing the sealing composition to form a seal that covers the edges of the slot liners. The sealing composition may be applied the short edges by dip coating the edges in an adhesive or using a dispenser to dispense the adhesive directly onto the edges. For the long edges, the sealing composition may be applied using an applicator designed to be inserted into the central bore hole of the stator. The application of the sealing composition to the edges of the slot liners can be done individually and sequentially, or more preferably, batch-wise using an applicator that is designed to dispense the sealing composition onto the edges in a batchwise fashion. A suitable applicator such as a multi-nozzle dispenser can be used to apply the sealing composition to several slot liner edges simultaneously. Depending on the adhesive used, the sealing composition may be cured thermally by heating to a required curing temperature, by curing under ultra-violet light, or by drying.

Thereafter, the assembly of conductive windings into the slots of the stator may be carried out. After the conductive windings have been assembled, the stator is heated to activate and cure the adhesive present in the heat activated adhesive layer in the slot liner.

The thermally expandable particles and adhesive in the heat activated adhesive and the sealing composition may be selected such that the heat activation of the thermally expandable particles and curing temperatures for the adhesives are mutually compatible. In one embodiment, the slot liner is cured, in a first step, by pre-heating at a first temperature $T_1$ to initiate expansion and foaming of thermally expandable particles in the adhesive layer; and in a second step, by further heating the slot liner at a second temperature $T_2$, where $T_2>T_1$. This selected temperature $T_1$ is preferably sufficiently low in order to ensure that the adhesive expansion is not overly vigorous, and to give time to the release of gases from the thermally expandable particles to avoid trapped gases which may lead to large voids in the cured adhesive. $T_2$ is selected to ensure that the thermally expandable particles are fully expanded.

$T_1$ and $T_2$ are not particularly limited. In one embodiment, $T_1$ is between 50 to 150° C., or more preferably between 80 to 110° C. $T_2$ is above $T_1$ and is between 100-200° C., or more preferably between 130-190° C. The foaming start temperature, $T_e$, of the thermally expandable particles preferably falls within the range $T_1{:}ST_e<T_2$. Additionally, if it is desired to cure the sealing composition at the same time, the curing temperature $T_s$ of the sealing composition may be set below $T_1$ so that it is cured at the first heating step at $T_1$. Alternatively, it may be set above $T_1$ but equal or less than $T_2$ so that it is cured at the second heating step at $T_2$. Purely as an example, if thermally expandable particles are selected such that $T_e$=140° C., then first heating step may be at $T_1$=100° C. and second heating step at $T_2$=160° C., and the sealing composition has a cure temperature of $T_s$=160° C.

Next, examples of the invention will be described in detail.

EXAMPLES

Example 1

In the present example, a heat activated adhesive layer was prepared using ingredients listed in Table 1.

TABLE 1

| Ingredient | Chemical identity | Mass(g) | Manufacturer |
|---|---|---|---|
| NPPN442 | Tri-phenylmethane epoxy resin | 69.3 | Nan Ya Plastics Corp. |
| YSLV-80XY | Crystallized epoxy resin | 0.7 | NIPPON STEEL Chemical & Material Co., Ltd. |
| YP-50EK35 | Phenoxy resin (MEK solution) | 20 | NIPPON STEEL Chemical & Material Co., Ltd. |
| BTA731 | Core-shell impact modifier | 5 | Dow Chemical Japan Corporation |
| FN-100SSD | Expandable microsphere foaming agent | 15 | Matsumoto Yushi-Seiyaku Co., Ltd |
| 2MZA-PW | Imidazole curing accelerator | 0.9 | Shikoku Chemicals Corporation |
| Dicyanex™ 1400F | Dicyandiamide latent curing agent | 7 | Evonik Japan K.K. |
| Cab-O-Sil™ TS720 | Fumed silica thickener | 2 | Cabot Japan K.K. |
| Dowsil™ Z6040 | Silane coupling agent with epoxy functional group | 0.4 | Dow Toray Industries, Inc. |
| MEK | Methyl ethyl ketone solvent | 50 | Maruzen Petrochemical |
| | Total weight | 170.3 | |
| | Solids weight | 107.3 | |

The ingredients were mixed to form an adhesive composition which was then coated on one side of a 75 μm PEN film (Teonex™ Q5175 from Toyobo Film Solutions Ltd). Coating weight of adhesive composition was 35 g/m2 on one side. After drying in oven at 100° C., the coated surface was laminated with a polyester sheet (Daio paper, basis weight 23 g/m2) as the adhesive permeable cover layer. After lamination of the adhesive permeable cover layer, the multi-layer sheet was heated again at 87° C. The same adhesive composition was coated on the other side of the PEN film, then dried and laminated with the polyester sheet again, forming a five-layer multilayer sheet.

Next, sections from the multilayer sheet were cut to provide four slot liner specimens (Ref.1, Comp.1, Ex. 1, Ex. 2) with 15 mm×40 mm dimensions. Three different adhesive sealing compositions (A, B, C) as listed in Table 2 for sealing the slot liner edges were prepared. No sealing composition was applied to Ref.1. For Comp.1, sealing composition A was applied to its edges, which is a low viscosity liquid. Sealing compositions B and C are, respectively, a high viscosity jelly, and a resin paste, and were potted on the edges of specimens Ex.1 and Ex.2 After setting aside the specimens for a day, each specimen was set in a 1.65 mm gap between 2 SPCC test pieces and cured in a single-step heat treatment at 160° C. for 5 minutes in a heat press machine. The cured specimens were then analyzed.

TABLE 2

| Sealing composition | Chemical | Manufacturer | Viscosity | Trade name |
|---|---|---|---|---|
| A | Cyanoacrylate | Toa Gosei Co., Ltd. | 0.001-0.005 Pa · s | Aron Alpha 201 |
| B | Cyanoacrylate | Toa Gosei Co., Ltd. | 170 Pa · s | Aron Alpha Jelly |
| C | Cyrilized Urethane resin | Konishi Co., Ltd. | 80-150 Pa · s | Bond Ultra Versatile Premium Soft SU |

Using an optical microscope (VHZ20, Keyence Corp.), shrinkage of each specimen was measured, and any delamination was visually checked. Applying Equation 1:

$$\text{Percentage shrinkage} = \frac{\text{change in length of the adhesive permeable cover layer after curing}}{\text{initial length of slot liner speciment (i.e. 40 mm)}} \times 100\%$$

data was collected and percentage shrinkage was calculated and tabulated in Table 3. It was observed that specimens Ref. 1 and Comp. 1 had shrinkage and delamination of the adhesive permeable cover layer from the substrate. Ex.1 and Ex.2 which were edge sealed with high viscosity cyanoacrylate adhesive showed much lower shrinkage and no delamination at the edges.

TABLE 3

| Examples | Sealing composition | Shrinkage (μm) | Shrinkage (%) | Delamination? (Yes/No) |
|---|---|---|---|---|
| Ref. 1 | None | 611 | 1.53 | Yes |
| Comp. 1 | A | 457 | 1.14 | Yes |
| Ex. 1 | B | 127 | 0.32 | No |
| Ex. 2 | C | 68 | 0.17 | No |

Example 2

In this example, a two-step heat treatment for activating and curing the heat activated adhesive layer of the slot liner was evaluated for its effect on the expansion and shrinkage of the heat activated adhesive layer, without sealing the edges of the slot liner. The first heating step occurs at a lower temperature at or below $T_e$, the foaming start temperature of the thermally expandable particles.

The heat activated adhesive layer was similarly prepared using ingredients listed in Table 1. Methyl Ethyl Ketone (MEK) was used as a solvent to aid in the in mixing of the components. The formulation information in Table 1 is provided on a dry weight percent basis (i.e. without solvent). The ingredients were mixed to form the heat activated adhesive composition which was then coated on one side of a 75 μm PEN film (Teonex™ Q5175 from Toyobo Film Solutions Ltd). After drying in oven, the coated surface was laminated with a polyester sheet (Daio paper, basis weight is 23 g/m$^2$) as the adhesive permeable cover layer. Coating weight of adhesive composition was 35 g/m$^2$ per one side. After lamination of the adhesive permeable cover layer, the multi-layer sheet was heated at 87° C. The same adhesive composition was coated on the other side of the PEN film, then dried and laminated with the polyester sheet again, forming a five-layer multilayer sheet.

Next, sections from the multilayer sheet were cut to provide seven slot liner specimens (Ref.1, Comp.1, Ex. 1, Ex. 2, Ex. 3, Ex. 4, Ex. 5 and Ex. 6) with 15 mm×40 mm dimensions. Duration of the first heating step was varied for each specimen. For Ref 1, duration of the first heating step was 0 min. For Comp. 1, the first heating step was 10 min. For Ex. 1 to Ex. 6, the duration of the first heating step was increased from 20 min (Ex. 1) to 60 min (Ex.6). Temperature for the first heating step was set at 100° C., which is lower than $T_e$ of the thermally expandable particles which is approximately at 140° C. Thereafter, each specimen was set in a 1.65 mm gap between 2 SPCC test pieces and cured in a second-step heating step treatment at 160° C. for 5 minutes. The cured specimens were then analyzed.

Thickness of each specimen was measured at initial, after first heating step, and after second heating step using a thickness gauge (Mitutoyo Corp.). From the thickness measurements, a foaming percentage was calculated with Equation 2:

$$\text{Foaming percentage} = \frac{\text{Thickness of slot liner after curing}}{\text{initial thickness of slot liner}} \times 100\%$$

Using an optical microscope (VHZ20, Keyence Corporation), shrinkage of each specimen was measured, and the shrinkage percentage in accordance with Equation 1 of each specimen was calculated. The specimens were also checked for any delamination. Using data collected, foaming percentage and shrinkage percentage was calculated and tabulated in Table 4.

In Ex. 1 to Ex.5, both the foaming percentage and shrinkage percentage were lower than in Ref.1. In general, Ex.1 to Ex.5 achieved shrinkage of less than 1.5%, or more specifically, less than 1.3%, and no delamination occurred. Delamination occurred in both Ref. 1 and Comp. 1.

In summary, in the light of these results, it was found that a 2-step heating process at $T_1$ and then at $T_2$, where $T_1$:S$T_e$<$T_2$ and $T_e$=foaming start temperature of the thermally expandable particles, could moderate the expansion rate of the adhesive during the heating and foaming process, such that the shrinkage of the adhesive permeable cover layer after curing is advantageously reduced. It is conceivable that the heating process may alternatively be varied as appropriate by increasing temperatures linearly, exponentially or logarithmically from $T_1$ to $T_2$ in order to control the foaming vigor of the thermally expandable particles.

TABLE 4

| | | Thickness | | | | Shrinkage | | | |
|---|---|---|---|---|---|---|---|---|---|
| Examples | Preheat duration (min) | Initial (μm) | After preheat (μm) | After cure (μm) | Foaming (%) | After preheat (μm) | After cure (μm) | Shrinkage (%) | Delaminate? (Yes/No) |
| Ref. 1 | 0 | 191 | — | 570 | 298 | 0 | 611 | 1.53 | Yes |
| Comp. 1 | 10 | 195 | 191 | 555 | 285 | 88 | 609 | 1.52 | Yes |
| Ex. 1 | 20 | 192 | 193 | 555 | 289 | 111 | 508 | 1.27 | No |
| Ex. 2 | 30 | 202 | 199 | 474 | 235 | 119 | 250 | 0.63 | No |
| Ex. 3 | 40 | 194 | 191 | 361 | 186 | 121 | 254 | 0.64 | No |
| Ex. 4 | 50 | 197 | 198 | 320 | 162 | 113 | 176 | 0.44 | No |
| Ex. 5 | 60 | 198 | 199 | 278 | 140 | 125 | 121 | 0.3 | No |

Various other modifications and adaptations of the invention will be apparent to the person skilled in the art after reading the foregoing disclosure without departing from the spirit and scope of the invention and it is intended that all such modifications and adaptations come within the scope of the appended claims.

What is claimed is:

1. A multi-layer slot liner for a rotary electrical system, comprising an electrically insulating substrate layer, a first heat-activated adhesive layer comprising thermally expandable particles which is arranged on a first surface of the substrate layer, and a first adhesive permeable cover layer arranged on the first heat-activated adhesive layer, at least two of the layers extending together and terminating at an edge, wherein the edge is covered by a seal.

2. The multi-layer slot liner of claim 1, further comprising:

a second heat activated adhesive layer arranged on a second surface of the substrate layer, the second surface being located on an opposing side of the substrate layer from the first surface, and a second adhesive permeable cover layer arranged on the second heat-activated adhesive layer.

3. The multi-layer slot liner of claim 2, wherein all the layers terminate at the edge, and the seal contacts an end of each of the layers at the edge.

4. The multi-layer slot liner of claim 1, wherein the seal comprises an adhesive selected from the group consisting of cyanoacrylate adhesive and urethane adhesive.

5. The multi-layer slot liner of claim 1, wherein the heat activated adhesive layer comprises an epoxy adhesive and a latent curing agent.

6. The multi-layer slot liner of claim 5, wherein the epoxy adhesive is obtained from a triphenylmethane type phenol resin.

7. The multi-layer slot liner of claim 1, wherein the adhesive permeable cover layer comprises polyester nonwoven fiber.

8. The multi-layer slot liner of claim 1, wherein a length of the adhesive permeable cover layer shrinks by less than 1.5% compared to its initial length after curing.

9. A stator assembly for a rotary electrical system, the stator assembly comprising a plurality of slots insulated by a multi-layer slot liner of claim 1.

10. The stator assembly of claim 9, wherein the multi-layer slot liner is configured to have the edge covered by the seal arranged outside of the slot when the slot liner is positioned in the slot.

11. A method of sealing a slot in a stator of a rotary electrical system, comprising:

providing a continuous multi-layer sheet comprising an electrically insulating substrate layer, a first heat activated adhesive layer arranged on a first surface of the substrate layer, and a first adhesive permeable cover layer arranged on the first heat-activated adhesive layer, at least two of the layers extending together and terminating at an edge, cutting a section of the sheet to form a slot liner and arranging the slot liner into a slot of the stator repeatedly until all slots are filled, applying a sealing composition to the edges of the slot liners, and curing the sealing composition to form a seal that covers the edges of the slot liners.

12. The method of claim 11, wherein the sealing composition comprises a high viscosity adhesive fluid.

13. The method of claim 11, wherein the heat activated adhesive layer comprises thermally expandable particles having a foaming start temperature $T_e$, and in a first step, the slot liner is heated to a first temperature $T_1$:S$T_e$ to initiate expansion of the heat activated adhesive layer, and in a second step, the slot liner is heated to a second temperature $T_2 > T_e$ to cure the heat activated adhesive layer.

14. The method of claim 11, further comprising: after sealing the edge of the slot liner, arranging conductive windings into the slot, and heating the slot liner to activate and cure the heat-activated adhesive layer.

* * * * *